(12) United States Patent
Rieth

(10) Patent No.: US 12,415,222 B2
(45) Date of Patent: Sep. 16, 2025

(54) MILLING MACHINE, IN PARTICULAR HAND-HELD MILLING MACHINE, FOR MILLING BEVELS AND FILLETS

(71) Applicant: GERIMA HOLDING GMBH, St. Wendel (DE)

(72) Inventor: Stephan Rieth, St. Wendel (DE)

(73) Assignee: GERIMA HOLDING GMBH, St. Wendel (DE)

( * ) Notice: Subject to any disclaimer, the term of this patent is extended or adjusted under 35 U.S.C. 154(b) by 1144 days.

(21) Appl. No.: 17/255,225

(22) PCT Filed: Jun. 25, 2019

(86) PCT No.: PCT/DE2019/100583
§ 371 (c)(1),
(2) Date: Dec. 22, 2020

(87) PCT Pub. No.: WO2020/001701
PCT Pub. Date: Jan. 2, 2020

(65) Prior Publication Data
US 2021/0268592 A1    Sep. 2, 2021

(30) Foreign Application Priority Data

Jun. 25, 2018   (DE) ...................... 20 2018 103 581.9

(51) Int. Cl.
*B23C 3/12*  (2006.01)
*B23Q 11/00*  (2006.01)
(Continued)

(52) U.S. Cl.
CPC .......... *B23C 3/126* (2013.01); *B23Q 11/0032* (2013.01); *B23C 2220/16* (2013.01);
(Continued)

(58) Field of Classification Search
CPC ............ B23C 2250/04; B23C 2250/16; B23C 3/12–3/128; B23C 2220/16;
(Continued)

(56) References Cited

U.S. PATENT DOCUMENTS 6,733,216 B2 *   5/2004   Bohringer ............... B23C 3/126
                                                                        409/185
7,510,464 B2     3/2009   Stierle
(Continued)

FOREIGN PATENT DOCUMENTS

CN         1715707 A      1/2006
CN       102950526 A      3/2013
(Continued)

OTHER PUBLICATIONS

Machine Translation of DE 20312714-U1, which DE '714 was published Dec. 2003.*

(Continued)

*Primary Examiner* — Erica E Cadugan
(74) *Attorney, Agent, or Firm* — LUCAS & MERCANTI, LLP; Klaus P. Stoffel

(57) ABSTRACT

A milling machine, in particular a hand-held milling machine, for milling bevels and fillets, having a housing in which a drive device and a spindle are mounted, wherein the spindle is configured to receive at least one cutting device and is connected to the drive device via at least one transmission. Additionally, a rebound damper for protecting the transmission is provided on the spindle.

13 Claims, 7 Drawing Sheets

(51) Int. Cl.
*B25F 5/00* (2006.01)
*F16D 7/08* (2006.01)
*F16F 15/123* (2006.01)

(52) U.S. Cl.
CPC ...... *B23C 2250/16* (2013.01); *B23C 2260/08* (2013.01); *B23C 2260/84* (2013.01); *B23Q 2705/026* (2013.01); *B25F 5/001* (2013.01); *B25F 5/006* (2013.01); *F16D 7/08* (2013.01); *F16F 15/12306* (2013.01); *Y10T 409/304144* (2015.01); *Y10T 409/304312* (2015.01); *Y10T 409/306496* (2015.01); *Y10T 409/309352* (2015.01)

(58) Field of Classification Search
CPC ......... Y10T 409/304312; Y10T 408/76; Y10T 409/304144; B23Q 11/0032; B25F 5/006; F16D 7/08
USPC ...................... 409/141, 138; 408/143; 464/36
See application file for complete search history.

(56) References Cited

U.S. PATENT DOCUMENTS

| | | | |
|---|---|---|---|
| 9,162,349 | B2 | 10/2015 | Ikuta |
| 2006/0053960 | A1 | 3/2006 | Stierle |
| 2006/0225906 | A1 | 10/2006 | Chen |
| 2010/0092261 | A1 | 4/2010 | Rieth |
| 2013/0048330 | A1* | 2/2013 | Ikuta ........................ F16D 7/08 173/216 |

FOREIGN PATENT DOCUMENTS

| | | | | |
|---|---|---|---|---|
| DE | 3922552 | A1 | 1/1991 | |
| DE | 20203391 | U1 * | 7/2003 | ............ B23C 3/126 |
| DE | 20312714 | U1 * | 12/2003 | |
| DE | 102004032177 | A1 | 1/2006 | |
| EP | 2056987 | B1 | 5/2009 | |
| EP | 2492051 | A1 | 8/2012 | |
| EP | 2561961 | A1 | 2/2013 | |
| KR | 101762609 | B1 * | 8/2017 | ............ B23C 3/126 |
| WO | 2008025350 | A2 | 3/2008 | |
| WO | WO-2013007252 | A1 * | 1/2013 | ............ B23C 3/126 |

OTHER PUBLICATIONS

Machine Translation of DE 3922552 A1, which DE '552 was published Jan. 1991.*
Machine Translation of KR 10-1762609, which KR '609 was published Aug. 2017.*
Machine Translation of WO 2013/007252, which WO '252 was published Jan. 2013.*
Machine Translation of DE 20203391 U1, which DE '391 was published Aug. 2003.*

* cited by examiner

MILLING MACHINE, IN PARTICULAR HAND-HELD MILLING MACHINE, FOR MILLING BEVELS AND FILLETS

CROSS-REFERENCE TO RELATED APPLICATIONS

The present application is a 371 of International application PCT/DE2019/100583, filed Jun. 25, 2019, which claims priority of DE 20 2018 103 581.9, filed Jun. 25, 2018, the priority of these applications is hereby claimed and these applications are incorporated herein by reference.

BACKGROUND OF THE INVENTION

The invention relates to a milling machine, in particular a hand-held milling machine, for milling bevels and fillets, having a housing in which a drive installation and a spindle are mounted, wherein the spindle is configured for receiving at least one cutting installation and by way of at least one gearbox is connected to the drive installation.

A milling machine of this type is known from EP 2 056 987 B1. Shown there is a hand-held milling machine in which a drive installation and a spindle are mounted in a housing and connected by way of an angular gear. A milling head which has a plurality of cutting inserts and is able to be driven by way of the drive installation is fastened to a free end of the spindle. In order to cushion impact-type stresses on the cutting inserts when milling, the spindle is configured in two parts and a spring is disposed between the two spindle parts. This enables force peaks to be cushioned which leads to reduced wear on the cutting inserts.

SUMMARY OF THE INVENTION

It is an object of the invention to enable a milling machine having improved handling, cutting performance, and cutting quality.

This object is achieved in that a rebound damper for protecting the gearbox is provided on the spindle. The impact-type stresses which result from the intermittent engagement of the cutting inserts in the workpiece are damped by the rebound damper, and a uniform torque and rotating speed profile is achieved on the gearbox. Consequently, the gearbox is subjected to less wear, and a higher service life as well as a longer durability of the cutting inserts can be achieved in comparison to the known milling machines. The rebound damper moreover also facilitates the handling of the hand-held milling machine since the user of the hand-held milling machine usually has to absorb the rebound actions with their hands.

In one advantageous embodiment of the invention, the rebound damper can be configured as a damping mass. Hand-guided milling machines are usually specifically conceived such that said machines have a low weight in order to enable simple handling. The use of an additional damping mass which increases the weight of the milling machine is therefore unusual. However, it has been demonstrated that the advantage by way of the higher performance of the milling machine by virtue of the damping mass significantly outweighs the disadvantage of the additional weight.

In order for a high output density to be achieved with hand-held milling machines, small and thus lightweight drive installations are used, the latter however typically being operated at relatively high rotating speeds of the spindle which is provided for supporting a milling head, wherein the rotating speeds of the drive are typically in the range from 20 000 to 30 000 rpm. Machining at output rotating speeds of 2000 to 12 000 rpm becomes possible by means of a gearbox with a correspondingly high negative gearing. Significant fluctuations in the rotating speed during milling with known milling machines arise in particular at low output rotating speeds of 2000 to 8000 rpm, on account of which the quality of machining is compromised and the gearbox as well as the cutting inserts are damaged. The inertia torque of the spindle is increased on account of the mass of the damping mass such that the impact-type stresses decelerate the milling head to a lesser extent and accordingly lead to significantly fewer variations in the angular speed of the spindle on the milling head. Moreover, the spindle having the damping mass at a lower rotating speed has the same kinetic energy as a common spindle at a high rotating speed such that, according to the invention, the same cutting energy can be generated at a lower rotating speed. This is advantageous in the machining of tough materials such as stainless steel, for example, where low cutting speeds are required. Not only is the rotating speed thus stabilized and the gearbox protected against rebound actions on account of the damping mass, but an energy accumulator which enables milling at intermittent loads even at a reduced rotating speed of up to 1500 rpm is also formed.

In one embodiment of the invention, the damping mass is disposed on the output-proximal gear wheel of the gearbox, the latter in the context of the invention also forming part of the spindle. Alternatively or additionally, the damping mass could also be disposed on the milling head which is preferably provided for receiving cutting installations, in particular indexable cutting inserts.

In one particularly preferred design embodiment of the invention, the damping mass is configured in such a manner that the ratio of inertia torque to the product of mass and length of an entity comprising the spindle and the damping mass is greater than $4.0 \cdot 10^{-3}$ m, preferably greater than $4.5 \cdot 10^{-3}$ m, and particularly preferably greater than $5 \cdot 10^{-3}$ m, this representing a measure for a particularly effective use of the mass.

Tests have shown that a particularly positive effect can be achieved when the ratio of inertia torque to the product of mass and length of the entity comprising the spindle and the damping mass is greater than $6 \cdot 10^{-3}$ m, in particular greater than $6.5 \cdot 10^{-3}$ m, or greater than $7.0 \cdot 10^{-3}$ m.

Likewise advantageously, the entity comprising the spindle and the damping mass can be configured in such a manner that the ratio of maximum diameter to length of the entity comprising the spindle and the damping mass is preferably greater than 0.55, in particular greater than 0.6, particular preferably greater than 0.65.

In one preferred embodiment, the housing can be configured so as to be divided in the region of the rebound damper. The division can in particular be disposed where level with the rebound damper in the axial direction of the spindle and preferably run so as to be perpendicular to the longitudinal axis of the spindle. In order for the rebound damper to be received, the housing in the region of the division can have an annular rim on one part or both parts. Moreover, a flange for reliably connecting the two parts of the housing to one another can in each case be provided on both ends.

Technical details of three embodiments of the spindle with and without a milling head are reproduced hereunder:

|  | D1 [mm] | D2 [mm] | P [W] | Z [mm] | B [mm] | L [mm] | M [kg] | TR [m] | J [kg * m²] |
|---|---|---|---|---|---|---|---|---|---|
| V1 spindle without milling head | 72 | 107 | 2500 | 20 | 30 | 149.4 | 3.058 | 0.0313 | 0.003 |
| V1 spindle with milling head | 72 | 107 | 2500 | 20 | 30 | 176.2 | 3.612 | 0.02974 | 0.0032 |
| V2 spindle without milling head | 65.5 | 107 | 2000 | 15 | 20 | 143.5 | 3.415 | 0.031 | 0.00328 |
| V2 spindle with milling head | 65.5 | 107 | 2000 | 15 | 20 | 168.9 | 3.907 | 0.02956 | 0.00341 |
| V3 spindle without milling head | 72 | 107 | 1700 | 12 | 16 | 157.9 | 3.122 | 0.03248 | 0.00329 |
| V3 spindle with milling head | 72 | 107 | 1700 | 12 | 16 | 184 | 3.651 | 0.03189 | 0.00331 | where

| | |
|---|---|
| D1 | Maximum insert/milling head diameter |
| D2 | Maximum spindle diameter |
| P | Maximum output of the drive installation |
| Z | Maximum infeed |
| B | Maximum bevel width |
| L | Length of the spindle |
| M | Mass of the spindle |
| TR | Inertia radius of the spindle |
| J | Inertia torque of the spindle |

The maximum insert diameter herein is defined as the diameter of the orbit of a cutting region of the cutting installation, said cutting region having the largest radial spacing in relation to the rotation axis. A minimum insert diameter is accordingly defined as the diameter of the orbit of a cutting region of the cutting installation, said cutting region having the smallest radial spacing in relation to the rotation axis.

The infeed, when viewed in the axial direction of the spindle, is understood to be the spacing between the minimum insert diameter and a preferably planar contact face of the housing for the workpiece. The contact face can be configured on a spacer which is displaceable in the axial direction of the spindle such that the infeed can be set between the minimum infeed and the maximum infeed. The effect according to the invention is already demonstrated at the maximum infeed of 8 mm or more, or 10 mm or more, respectively, in particular 12 mm or more. This effect is particularly clearly demonstrated at an infeed of 15 mm or more. Machining by milling in the case of an infeed of 20 mm or more, in particular 30 mm or more, is anyway possible only using a milling machine according to the invention.

In the case of an infeed of 8 mm or more, the mass of an entity comprising the spindle and the damping mass is preferably 1 kg or more; in the case of an infeed of 15 mm or more, this mass is preferably 1.2 kg or more, particularly preferably 1.5 kg or more. In the case of an infeed of 20 mm or more, this mass is preferably 1.5 kg or more, in particular 2 kg or more, particularly preferably 3 kg or more. In the case of an infeed of 30 mm or more, this mass is finally preferably 1.8 kg or more, in particular 2.5 kg or more, particular preferably 3.5 kg or more.

The following correlations, in particular the correlations J/M/L and D2/L mentioned last have proven particularly advantageous herein:

|  | J/TR [kg * m] | J/M [m²] | TR/M [m/kg] | TR/D [-] | J/M/L [m] | D2/L [-] |
|---|---|---|---|---|---|---|
| V1 spindle without milling head | 0.095847 | 0.000981 | 0.010235 | 0.434722 | 0.00658 | 0.71812 |
| V1 spindle with milling head | 0.107599 | 0.000806 | 0.008234 | 0.413056 | 0.00503 | 0.60796 |
| V2 spindle without milling head | 0.105806 | 0.00096 | 0.009078 | 0.473282 | 0.00669 | 0.74565 |
| V2 spindle with milling head | 0.115359 | 0.000873 | 0.007566 | 0.451298 | 0.00517 | 0.63351 |
| V3 spindle without milling head | 0.101293 | 0.001054 | 0.010404 | 0.495878 | 0.00667 | 0.67764 |
| V3 spindle with milling head | 0.103794 | 0.000907 | 0.008735 | 0.48687 | 0.00493 | 0.58152 |

The maximum diameter of the spindle can correspond to the diameter of the milling head and be at most 72 mm, for example. It has proven particularly advantageous for the maximum diameter of the spindle to be configured at 82 mm or more, and in particular 100 mm or more. The ball bearing of the spindle mounting herein can have an internal diameter of 30 mm and/or an external diameter of 55 mm. The length of the spindle including the milling head herein is preferably less than 200 mm, in particular less than 180 mm. Additionally or alternatively, the length of the spindle including the milling head can be 50 mm or more, in particular 90 mm or more.

The damping mass is expediently fastened to the spindle in a rotationally fixed, in particular releasable, manner. Alternatively, the damping mass can also be connected to the spindle in a rotatable, in particular rotationally damped and/or rotationally sprung manner.

In one further embodiment, the damping mass can be configured so as to be integral to the spindle, wherein receptacles for indexable cutting inserts are advantageously provided directly in the spindle. In this case, the spindle in the region of the receptacles for the indexable cutting inserts can have an external diameter which is smaller than an annular face for the mounting of a bearing on the spindle such that a ball bearing is able to be pushed across the region of the receptacles for the indexable cutting inserts onto the annular face during the assembly, for example.

The damping mass can advantageously be provided on the spindle in such a manner that said damping mass projects from the spindle in the radial direction.

In one particularly advantageous design embodiment of the invention, the damping mass can thus comprise an appendage which preferably projects in the axial direction, thus in the direction of the rotation axis of the spindle. The appendage can be configured as an annular web which is interrupted or closed in the circumferential direction, and thus forms a hollow cylinder, or a hollow-cylindrical portion, respectively, which is fastened only at one end. A high inertia torque in association with a minor additional mass is achieved on account of the mass distribution which is spaced apart from the rotation axis. The smallest diameter of the appendage, or the internal diameter of the annular web, respectively, can be larger than the external diameter of a mounting of the spindle. On account thereof, a very high inertia torque results in association with a particularly space-saving construction mode of the milling machine. Preferably, the appendage, or the annular web, respectively, can moreover be releasably fastened, for example by means of screws, so as to enable a simple adaption to different machining procedures. The releasable annular web can advantageously have a mass of more than 1.0 kg, in particular more than 1.5 kg. The milling machine can comprise a plurality of damping masses of dissimilar masses which can be disposed on the spindle and optionally interchanged according to requirements.

In one further advantageous embodiment, at least part of a mounting of the spindle can be disposed within the appendage, or the annular web, respectively, this leading to the shaft being particularly well supported, in particular in the case of variations in angular momentums.

For forming a region in which the damping mass is disposed, the housing expediently has a cavity for receiving the damping mass. For forming the damping mass cavity, the housing preferably comprises an outward-protruding, in particular annularly encircling, convexity. On account of the damping mass being able to protrude from the inside into the convexity of the housing, the damping mass can be mounted at a larger radial spacing from the rotation axis, this resulting in an increased inertia torque of the spindle without however noticeably increasing the overall dimensions of the housing. In this context, those components that laterally enclose the spindle, thus also the gearbox housing or the spacer that is described with reference to the figures, are in particular also understood to be the housing.

In one further design embodiment of the invention, the milling machine is furthermore distinguished in that an internal total cavity is almost completely filled with the spindle and the damping mass.

In order for the gearbox to be protected in relation to particularly high impact-type stresses, the rebound damper can comprise a friction clutch which is advantageously disposed at the interface between the gearbox and the spindle. The friction clutch herein can be specified in such a manner that said friction clutch briefly opens the clutch connection when a torque acting on the friction clutch exceeds a predefined limit torque. The limit torque, or trigger torque, respectively, can be adjustable between 2 and 20 Nm, for example. The friction clutch comprises a first clutch part that is connected to the spindle, and a second clutch part that is connected to the gearbox, wherein the two clutch parts in a closing position of the clutch connection are connected in a rotationally fixed manner and in a releasing position of the clutch connection are rotatable relative to one another. In a friction clutch of this type, the clutch connection in the closing position can be achieved by means of a form-fit and/or friction-fit.

The friction clutch can be configured in such a manner that said friction clutch generates an acoustic and/or haptic signal (for example vibrations) when the clutch connection is opened. This enables a "learning effect" on the part of the user who, by way of the signal, is alerted directly to the clutch connection being opened, for example when an excessive width of the bevel has been chosen, the user applies excessive pressure on the workpiece, or the cutter blades are dull. To this end, at least one element can in each case be provided on the two clutch parts, said elements contacting one another and generating oscillations and/or noises in the event of the clutch parts moving relative to one another.

The friction clutch can particularly advantageously have latching elements on one clutch part, said latching elements by means of a retaining spring being pretensioned in latching depressions in the other clutch part. On account of the form-fit between the latching elements and the latching depressions, the two clutch parts are connected in a rotationally fixed manner in a clutch position when a torque that is smaller than a limit torque is to be transmitted. Beyond the limit torque that is a function of the geometry of the latching elements or the latching depressions, respectively, and the pretension on account of the retaining spring, the latching elements, counter to the force of the retaining spring, are however pushed out of the latching depressions into a releasing position, and the clutch connection between the two clutch parts is released. The pretension on the retaining spring can be able to be set in order to enable the limit torque of the friction clutch to be varied in a simple manner. The latching elements can advantageously be configured as latching balls, and the latching depressions can have a corresponding dome-shaped cross section such that the latching balls in the releasing position roll without friction in a mutual movement of the clutch parts.

In order for the impact-type stresses on the gearbox to be additionally cushioned, the spindle can comprise two spindle parts that are rotatable in relation to one another, a spring clutch transmitting the torque being disposed between said two spindle parts. On account of the spring clutch, the rotational energy in the event of an impact-type stress can be temporarily stored and subsequently be directly discharged again to the milling head. Herein, a first spindle part is particularly preferably configured for receiving the milling head, and the rebound damper is disposed on a second spindle part. Consequently, the impact-type stresses on the gearbox are damped on account of the rebound damper on the gearbox-proximal spindle part, and the spindle part which is separated from the latter by the spring clutch and comprises the milling head can cushion impact-type stresses on the milling head on account of the slight twisting potential in relation to the first-mentioned spindle part and thus relieve the stress on the milling head as well as the cutting inserts.

In one advantageous embodiment, the spindle can comprise a further gearbox which is preferably disposed on the drive-proximal end of the spindle, thus toward the first gearbox.

The further gearbox can particularly preferably comprise an internal ring gear that is releasably connected to the spindle, and a gear wheel that meshes with the internal ring gear and is releasably connected to the first gearbox. On account thereof, it is readily possible to disassemble the internal ring gear and the gear wheel, and to assemble an internal ring gear as well as a gear wheel with another gear ratio, on account of which the output rotating speed can be rapidly adapted to the materials to be machined. In this embodiment, the friction clutch can be disposed between the gearboxes, or else within the further gearbox. Instead of the internal ring gear, however, a correspondingly larger gear wheel can also be provided on the output side. In one alternative embodiment, the internal ring gear, or the larger gear wheel, can also be connected to the spindle in a non-releasable, in particular integral, manner.

The cutting installation can be configured as a milling head with indexable cutting inserts that can be fastened to the spindle. Alternatively, the cutting installation can also be configured in the form of a plurality of indexable cutting inserts which by way of corresponding receptacles on the free end of the spindle are connected to the spindle.

Further particularities and advantages of the invention are derived from the description hereunder of a preferred exemplary embodiment by means of the drawings, in which:

BRIEF DESCRIPTION OF THE DRAWING

FIG. 4a shows an exploded illustration of the rotatable components that are vertically mounted in the front part of the milling machine, as illustrated in FIG. 3;

FIGS. 4b-d show in each case a sectional view through components shown in FIG. 4a;

DETAILED DESCRIPTION OF THE INVENTION

Figure 1:
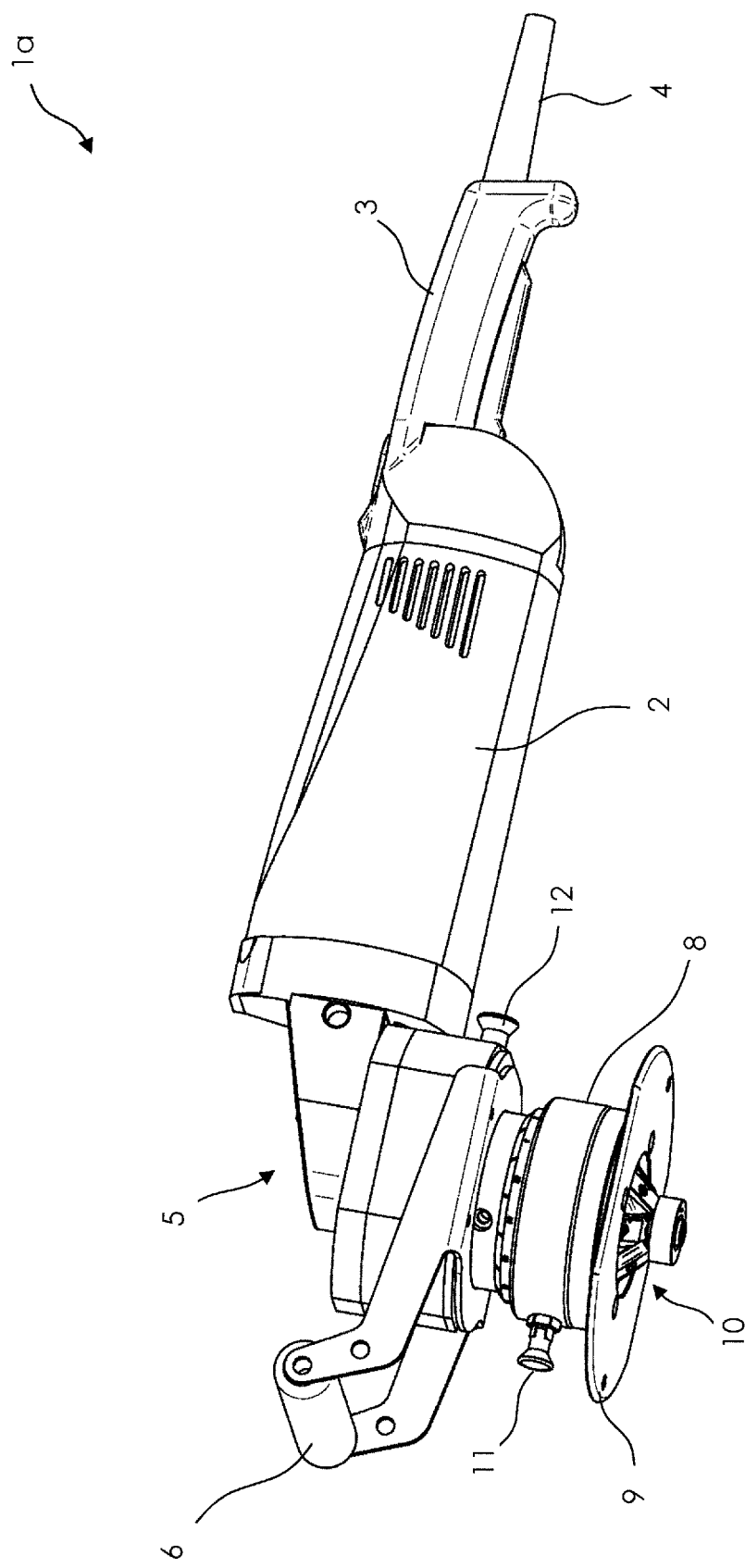
FIG. 1 shows a perspective illustration of a first embodiment of a milling machine for milling bevels on a workpiece.

FIG. 1 shows a perspective illustration of a first embodiment of a milling machine 1a for milling bevels on a workpiece (not illustrated). The milling machine 1a has a housing 2 having a first handle 3 and a power line 4 on one side, and a gearbox 5 having a second handle 6 on an opposite side. The gearbox 5 is configured as an angular gearbox, in particular a bevel gearbox, having an angle of 90° between the input shaft and the output shaft, and is driven by a drive installation which in the form of an electric motor 7a shown in FIG. 2 is mounted in the housing 2.

The gearbox 5 on the output side is adjoined by an adjustable spacer 8 having an annular, planar contact face 9 for the workpiece, a milling head 10 being disposed so as to be centric in and project from said contact face 9. The spacer 8 having the contact face 9 can be adjusted axially in relation to the milling head 10 once a retaining device in the form of a retaining pin 11 provided to this end has been released, such that the distance by which the milling head 10 projects in relation to the contact face 9 can be set. On account thereof, the edge length of the bevel to be made can be predefined. Furthermore provided on the gearbox 5 is a locking pin 12 for locking the gearbox 5, said locking pin 12 facilitating the assembly and disassembly of the milling head 10.

Figure 2:
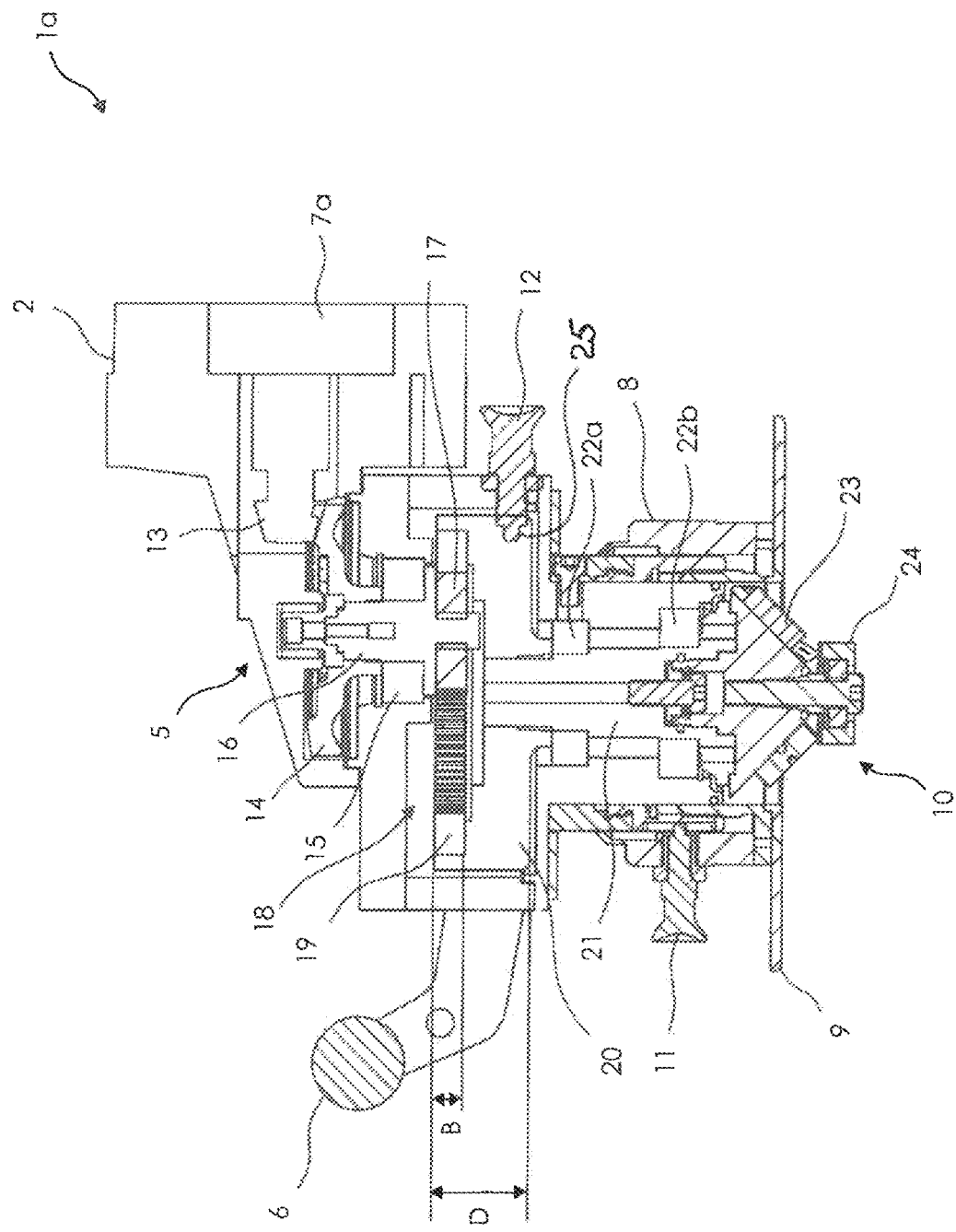
FIG. 2 shows a cross section through the front region of the milling machine of FIG. 1.

FIG. 2 shows a cross section through the front region of the milling machine 1a of FIG. 1. As can be derived therefrom, the moving parts of the gearbox 5 are formed by a bevel pinion 13 driven by the electric motor 7a, and by a bevel gear 14 that meshes with said bevel pinion 13. The bevel gear 14 by way of a layshaft 16 which is rotatably mounted by means of a roller bearing 15 is releasably connected to a gear wheel 17 of a further gearbox 18. The gear wheel 17 is disposed in an internal ring gear 19, said gear wheel 17 and said internal ring gear 19 conjointly forming the moving parts of the further gearbox 18. The internal ring gear 19 of the further gearbox 18 is releasably fastened to a cupped disk 20 at the drive-proximal end of a spindle 21. The gear wheel 17 and the internal ring gear 19, on account of being releasably fastened, can be replaced in a particularly simple manner, for example in order to achieve another gearing ratio.

The spindle 21, by means of a mounting in the form of two further roller bearings 22a, 22b, is rotatably mounted in the spacer 8 and at the free end of said spindle 21 has the conical milling head 10 which is occupied by interchangeable cutting inserts 23. A contact ball bearing 24 for a defined radial spacing from a workpiece to be machined is provided at the tip of the conical milling head 10. The external diameter of the roller bearings 22a, 22b herein is smaller than the external diameter of the cupped disk 20; in particular, the cupped disk 20 has an external diameter which is 1.5 to 3 times that of the roller bearings 22a, 22b.

As can be derived from FIG. 2, the cupped disk 20 on the drive side has a circular pocket for receiving the internal ring gear 19. As opposed to the usual narrow construction mode, the thickness D of the cupped disk 20 is however significantly larger and corresponds to at least 2 times, particular preferably to at least 2.5 times, the width B of the internal ring gear 19. This additional appendage in the direct proximity of the internal ring gear 19, thus being situated radially outward, forms a damping mass which, on account of the inertia torque thereof, when machining by milling dampens rebound actions of the milling head 10 in order for the gearbox 5 and also the further gearbox 18 to be protected. Alternatively, the damping mass may also be partially or completely formed by the internal ring gear which preferably has a width of more than 10 mm, in particular more than 15 mm.

Figure 4:
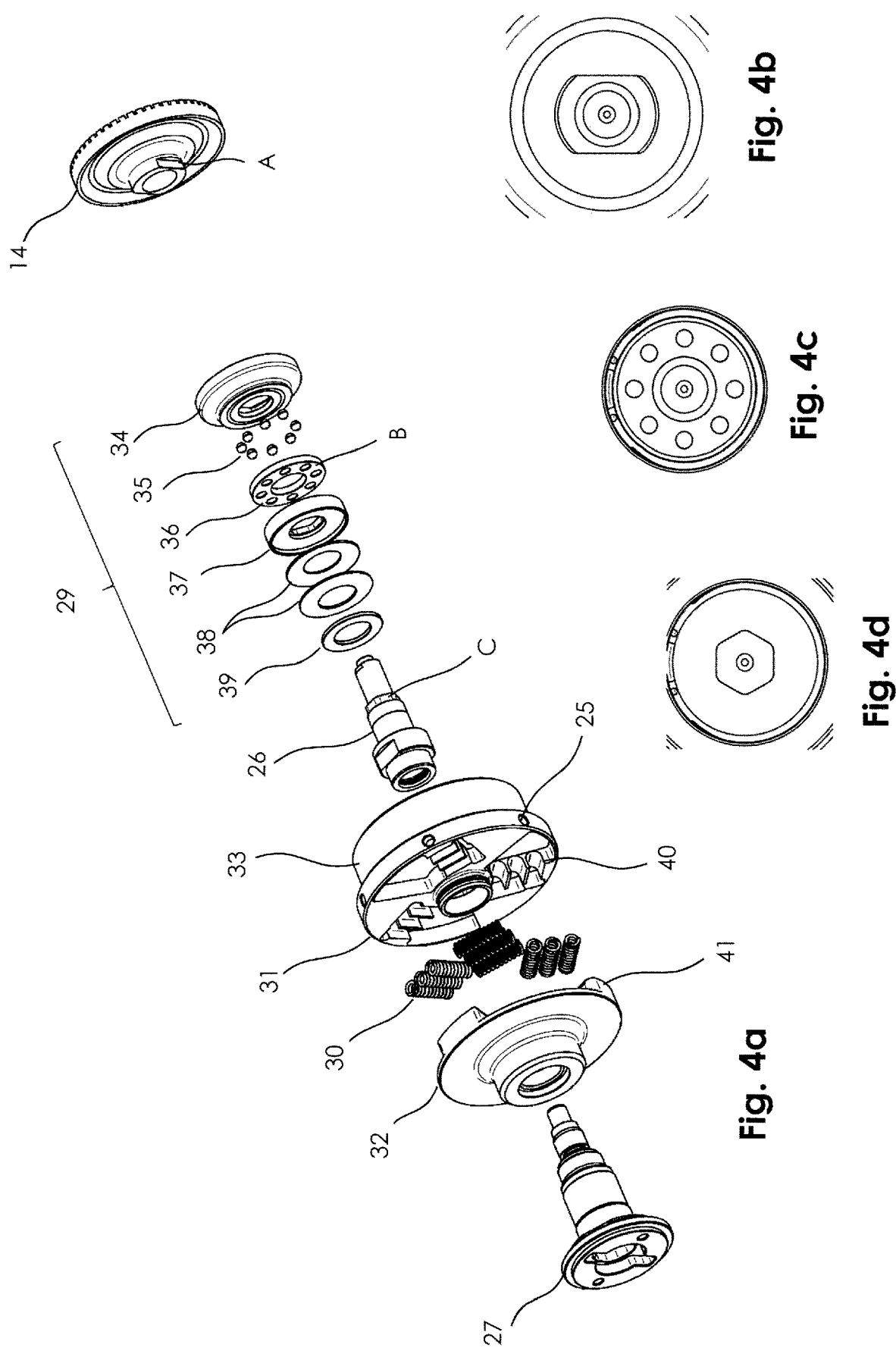

In order to enable locking of the spindle 21 and thus of the milling head 10, and to thus facilitate the assembly and disassembly of the milling head 10, the cupped disk 20 on the circumference thereof has recesses in the form of radial bores 25 which are illustrated in FIG. 4a, and in which the locking pin 12 can engage in a retaining manner.

Figure 3:
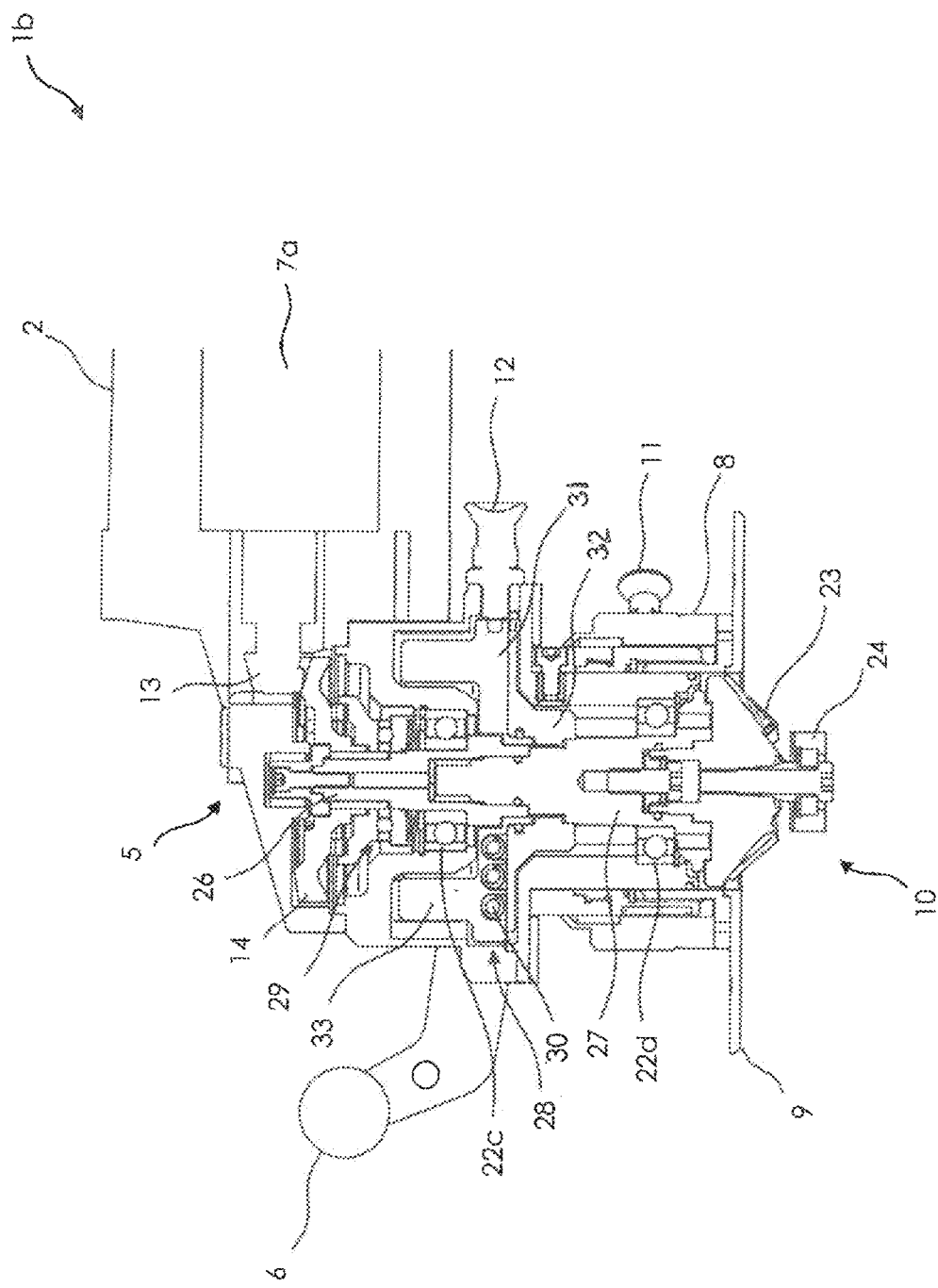
FIG. 3 shows a cross section through the front region of the second embodiment of a milling machine.

FIG. 3 shows a cross section through the front region of the second embodiment of a milling machine 1b. Those components that are unchanged in comparison to the first embodiment of FIG. 1 are provided with the same reference signs; components which deviate therefrom will be described in detail hereunder.

As is also the case in the embodiment of FIG. 1, an electric motor 7a drives a bevel pinion 13 which meshes with a bevel gear 14. The bevel pinion 13 and the bevel gear 14 are provided in the gearbox 5. As opposed to the embodiment of FIG. 1, no further gearbox is provided in the second embodiment shown here. Instead, the spindle 21 comprises two spindle parts 26, 27 which are rotatable in relation to one another and between which a spring clutch 28 that transfers the torque is disposed.

The first spindle part 26 by way of a roller bearing 22c is mounted in the spacer 8 and connected to the bevel gear 14 by way of a friction clutch 29 which will yet be described in more detail with reference to the figures hereunder. The second spindle part 27 is configured for receiving the milling head 10 and mounted in the spacer 8 by means of a roller bearing 22d.

The spring clutch 28 comprises a plurality of springs 30 which are mounted in a disk-shaped spring bearing 31 at the output-proximal end of the first spindle part 26 and are supported in relation to a disk-shaped counter bearing 32 at the drive-proximal end of the second spindle part 27.

Moreover disposed on the first spindle part 26 is a rebound damper in the form of an annular web 33, which in the axial direction projects from the disk-shaped spring bearing 31 and of which the internal diameter is larger than the external diameter of the roller bearing 22c. As can be derived from FIG. 3, the roller bearing 22c is moreover disposed within the annular web and is circumferentially enclosed by the latter.

FIG. 4a shows an exploded illustration of the rotatable components that are vertically mounted in the front part of the milling machine 1b, as illustrated in FIG. 3. The bevel gear 14 illustrated on the right is connected in a form-fitting manner to a first clutch part 34 of the friction clutch 29. To this end, the bevel gear 14 has a protrusion having lateral flat areas, said protrusion engaging in a form-fitting manner in a corresponding clearance in the first clutch part 34 and preventing mutual rotation. The cross section in the region A (in the assembled state) is shown in more detail in FIG. 4b.

The first clutch part 34 on the output side has an annular groove having a plurality of latching depressions which are not illustrated here. The latching depressions are disposed so as to be uniformly distributed in the circumferential direction and configured for receiving latching elements in the form of latching balls 35. In order for the latching balls 35 to bear across the full area in the latching depressions, the latching depressions preferably have a dome-shaped cross section.

A ball cage 36 is provided in order for the latching balls 35 to be mounted at a defined spacing in the circumferential direction. As can be derived from the cross section in the region B in FIG. 4c, the ball cage 36 has a plurality of through bores which are uniformly distributed in the circumferential direction and in which the latching balls 35 are disposed. The thickness of the ball cage 36 is less than the diameter of the latching balls 35 such that the latching balls project on both sides and bear on the first clutch part 34 as well as on a second clutch part 37 that is disposed on the output side.

The second clutch part 37 on that side that faces the latching balls is configured like the first clutch part 34; an annular groove (not shown here) having latching depressions which in terms of number and disposal correspond to the latching depressions on the first clutch part 34 such that the latching balls 35 which thereon project in relation to the ball cage 36 can engage in a retaining manner is thus provided here.

A continuous clearance is disposed so as to be central in the second clutch part 37, said clearance having functional faces that are distributed across the circumference such that said clearance can be mounted so as to be secured against rotation but axially displaceable on the first spindle part 26. As can be derived from the cross section in the region C (in the assembled state) in FIG. 4d, the clearance in the second clutch part 37 in the embodiment shown is configured having a hexagonal cross section, and the spindle 26 in the mounting portion provided to this end has a corresponding hexagonal cross section. Alternatively however, other form-fitting shaft-hub connections, such as a tongue-and-groove connection, etc., are also conceivable.

In order for the clutch parts 34, 37 to be mutually braced by way of the latching balls 35 disposed therebetween, a retaining spring in the form of a plurality of disk springs 38 is provided, said disk springs by way of a washer 39 being supported on the first spindle part 26 and being pretensioned in relation to the second clutch part 37. Depending on the order of the pretension on the disk springs 38, a greater or smaller prevailing torque is required in order for the latching balls 35 to be lifted out of the latching depressions counter to the force of the disk springs 38, on account of which the form-fit is released and the friction clutch is opened. This limit torque can be directly influenced by setting the pretension on the disk springs 38.

As can furthermore be derived from FIG. 4a, the spring bearing 31 at the output-proximal end of the first spindle part 26 has a plurality of clearances 40 which are uniformly distributed in the circumferential direction and in which the springs 30 are disposed. The springs 30 are configured as coil springs and mounted in the clearances 40 so as to be oriented tangentially in relation to the rotation axis. Three coil springs herein are in each case disposed so as to be mutually spaced apart in the radial direction, and a total of three clearances 40 of this type are provided.

Jaws 41 which project from the counter bearing 32 on the drive-proximal end of the second spindle part 27 engage in the clearances 40 in the spring bearing 31 such that the springs are pretensioned when the spindle parts 26, 27 mutually rotated in one direction. In the mutual impingement in the opposite direction, the jaws 41 bear directly on the spring bearing 31 such that there is no spring action of the clutch 28 in this rotating direction. However, further springs can also be provided in each case, said springs supporting the spring bearing 31 in a sprung manner in relation to the counter bearing 32 in the case of each mutual impingement. To this end, the springs would only have to bear in the circumferential direction on both sides on the jaws 41 and support the latter in relation to the spring bearing 31.

Figure 5:
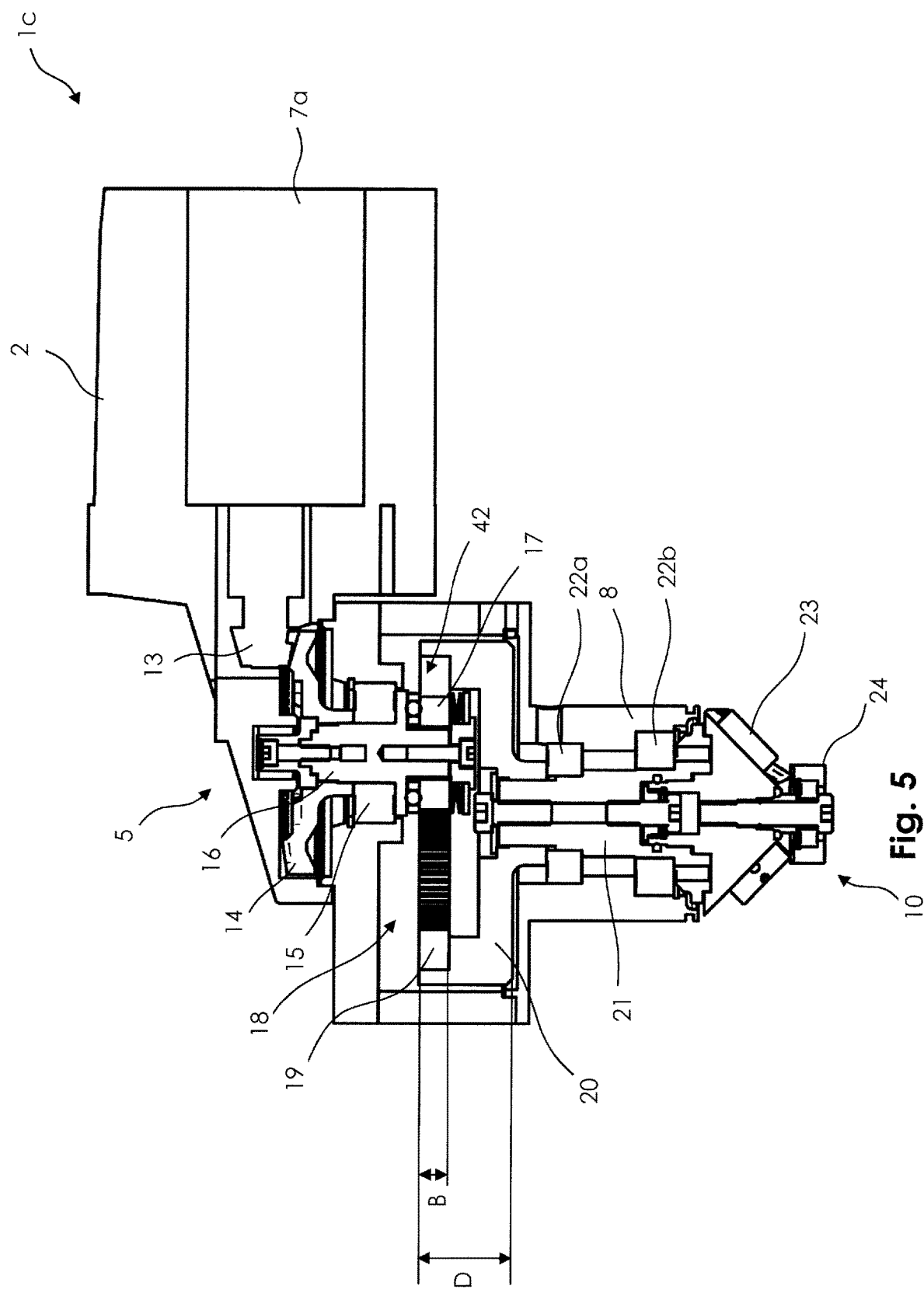
FIG. 5 shows a cross section through the front region of a third embodiment of a milling machine.

FIG. 5 shows a cross section through the front region of a third embodiment of a milling machine 1c. This embodiment corresponds substantially to the first embodiment shown in FIG. 2, wherein those components that are largely unchanged in comparison to the first embodiment of FIG. 1 are provided with the same reference signs. For improved visualization, additional components such as the second handle or parts of the spacer 8, such as the contact face 9, are moreover not illustrated once again.

Figure 6:
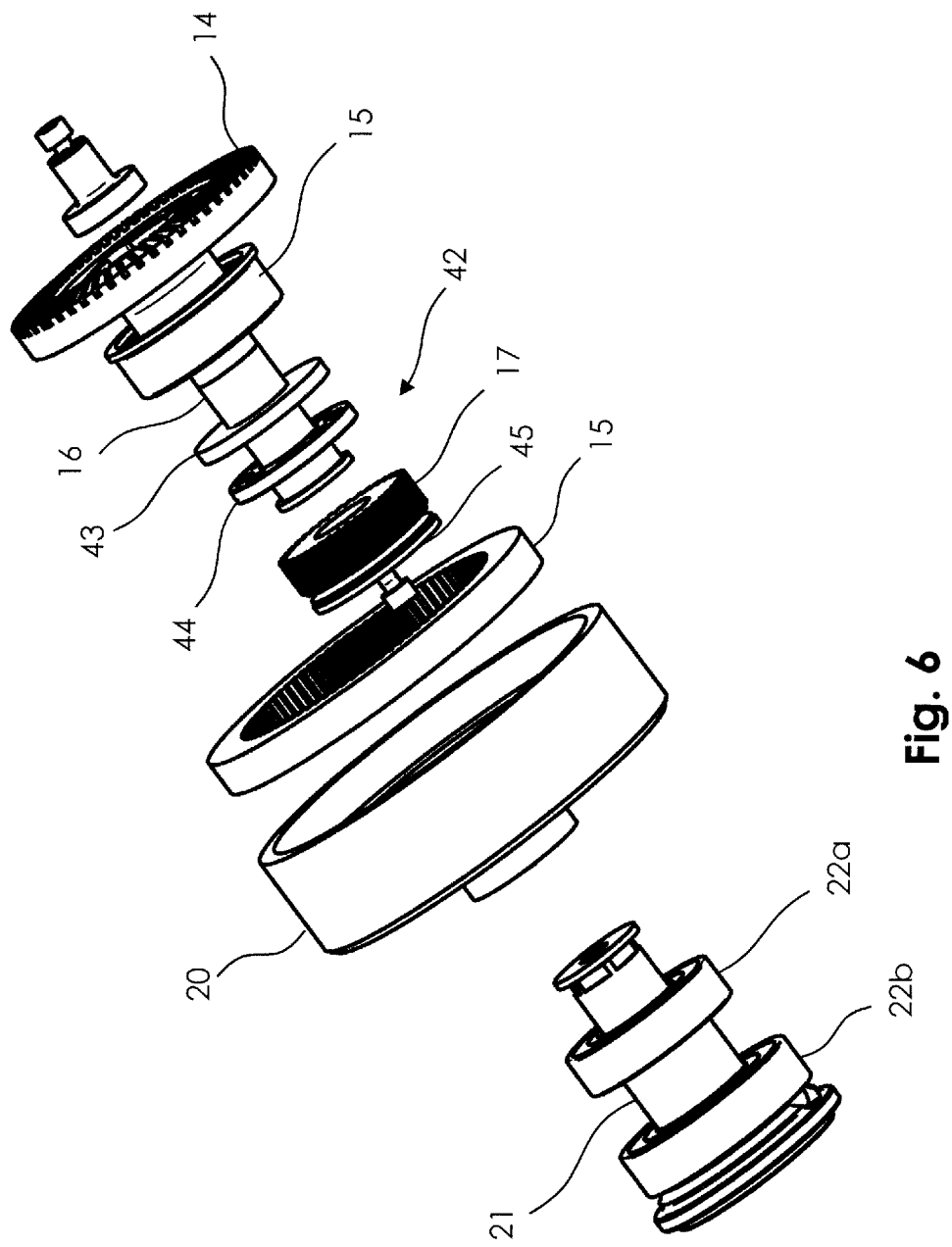
FIG. 6 shows an exploded illustration of the rotatable components that are vertically mounted in the front part of the milling machine, as illustrated in FIG. 5.

As can be derived from the comparison with the first embodiment shown in FIG. 2, a friction clutch 42 is disposed between the gear wheel 17 of the further gearbox 18 and the layshaft 16 in the third embodiment, said friction clutch 42 being described in more detail hereunder with reference to FIG. 6.

FIG. 6 shows an exploded illustration of the rotatable components that are vertically mounted in the front part of the milling machine 1c, as is illustrated in FIG. 5. As is also the case in the first embodiment, the layshaft 16 is connected in a rotationally fixed manner to the bevel gear 14 and by way of the roller bearing 15 mounted in relation to the spacer 8 which is not illustrated here. Moreover, a first clutch part in the form of a disk 43 is fastened to the layshaft 16. Like the clutch parts 34, 37 of the second embodiment, the disk 43 on that side that faces the gear wheel 17 has an annular groove (not illustrated here) having uniformly distributed latching depressions. A ball cage 44 having a plurality of latching balls is rotatably mounted on the layshaft 16 so as to be adjacent to the disk 43. In terms of the design embodiment of the ball cage 44, reference is likewise made to the ball cage 36 of the second embodiment.

Unlike the second embodiment, the second clutch part in the third embodiment is integrated in the gear wheel 17 which is rotatably mounted on the layshaft 16 so as to directly neighbor the ball cage 44. To this end, the gear wheel 17 on that side that faces the ball cage 44 has a groove and latching depressions which correspond to the groove and to the latching depressions on the disk 43. In order for the gear wheel 17 to be pretensioned in relation to the disk 43, disk springs 45 which are supported on the layshaft 16 are disposed on that side of the gear wheel 17 that faces away from the ball cage 44. Beyond a limit torque that is predefined by the retaining force of the disk springs 45, the friction clutch 42 is consequently released, and the gear wheel 17 can rotate freely in relation to the layshaft 16.

Figure 7:
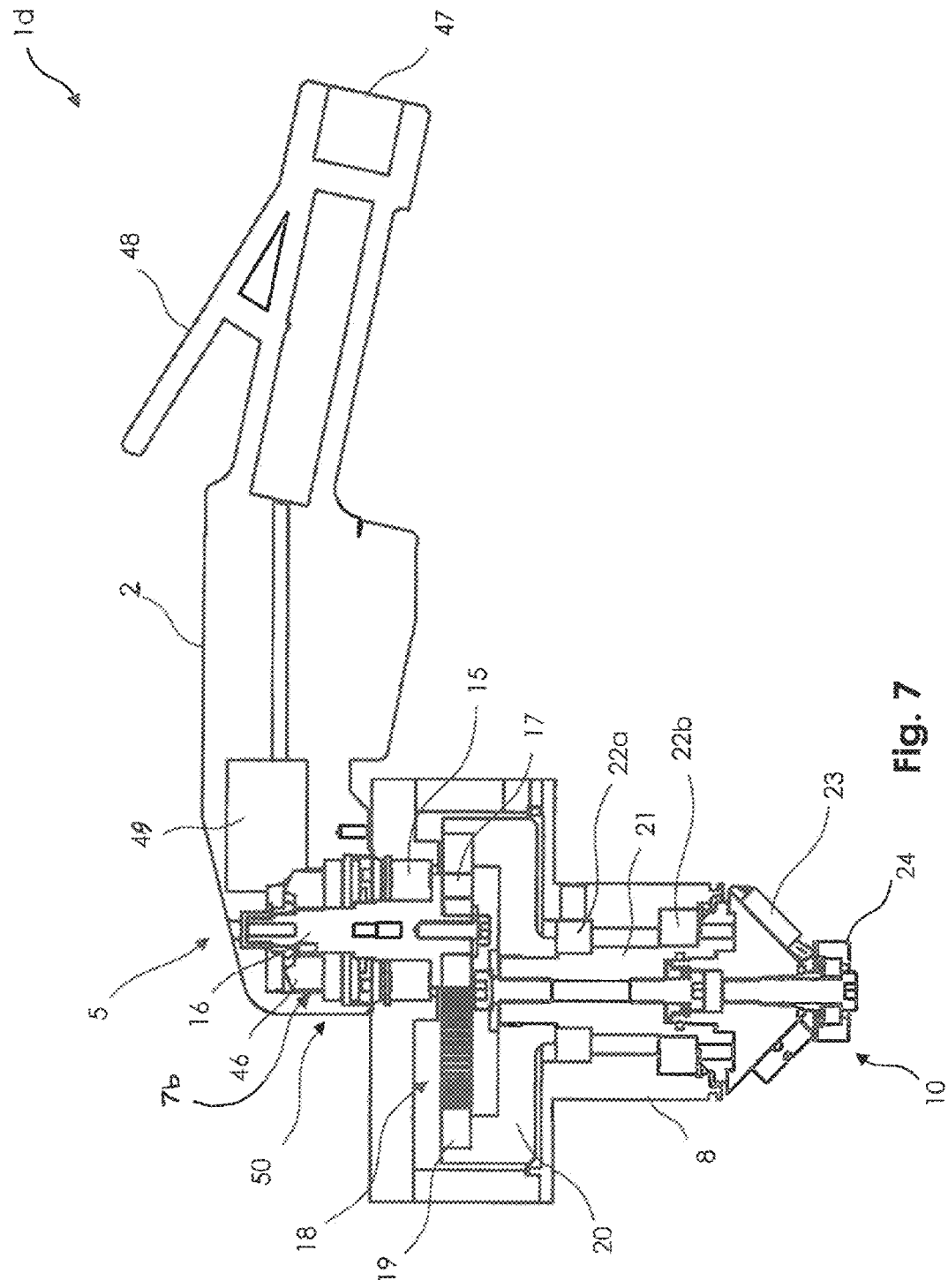
FIG. 7 shows a cross section through a fourth embodiment of a milling machine.

FIG. 7 shows a cross section through a fourth embodiment of a milling machine 1*d*. In contrast to the first embodiment, the drive installation there is configured as a compressed air motor 7*b* having a multi-disk motor 46 which can be driven by compressed air. In the context of this disclosure, the conversion of the energy contained in the compressed air in the multi-disk motor 46 is likewise referred to as a gearbox 5. For supplying the compressed air, a compressed air connector 47 from which the compressed air by way of a schematically indicated metering lever 48 is supplied to the multi-disk motor 46 by way of ducts 49 is provided on the housing 2. In an alternative embodiment, a turbine wheel can also be used instead of the multi-disk motor as a drive installation. As is also the case in the second and the third embodiment, a friction clutch 50 which opens the clutch connection in the case of an excessive prevailing torque is provided. The friction clutch is of a substantially identical construction; only the positioning differs from the previously described exemplary embodiments.

As can be derived from FIG. 7, the friction clutch 50 is disposed on the layshaft 16 so as to be on the drive-proximal side of the roller bearing 15 and comprises the following components which are in each case disposed so as to neighbor one another: a disk having an annular groove and latching depressions which as a first clutch part is fixedly connected to the layshaft; a ball cage which has latching balls and is rotatably mounted on the layshaft 16; and a second disk which is fixedly connected to the multi-disk motor 46 but mounted so as to rotate in relation to the layshaft 16 and in a manner corresponding to the first disk has a groove and latching depressions. The functional mode of the friction clutch herein corresponds to that of the previously described friction clutches.

The invention also comprises all variants which result from combining the features that have been described in the individual exemplary embodiments and have not been individually described merely for the sake of clarity. In particular, in all embodiments shown a damping mass can be disposed directly after the first gearbox, when viewed from the drive installation in the force flux direction, thus also directly on the output-proximal gear wheel of the first gearbox.

LIST OF REFERENCE SIGNS

1*a*, 1*b*, 1*c*, 1*d* Milling machine
2 Housing
3 First handle
4 Power line
5 Gearbox
6 Second handle
7*a* Electric motor
7*b* Compressed air motor
8 Spacer
9 Contact face
10 Milling head
11 Holding pin
12 Locking pin
13 Bevel pinion
14 Bevel gear
15 Roller bearing
16 Layshaft
17 Gear wheel
18 Further gearbox
19 Internal ring gear
20 Cupped disk
21 Spindle
22*a*, 22*b* Further roller bearings
23 Cutting inserts
24 Contact ball bearing
25 Radial bores
26 First spindle part
27 Second spindle part
28 Spring clutch
29 Friction clutch
30 Springs
31 Spring bearing
32 Counter bearing
33 Annular web
34 First clutch part
35 Latching balls
36 Ball cage
37 Second clutch part
38 Disk spring
39 Washer
40 Clearances in spring bearing
41 Jaws
42 Friction clutch
43 Disk
44 Ball cage
45 Disk spring
46 Multi-disk motor
47 Compressed air connector
48 Metering lever
49 Ducts
50 Friction clutch

The invention claimed is:

1. A milling machine for milling bevels and fillets, comprising:
    a housing;
    a drive installation mounted in the housing;
    a spindle mounted in the housing, wherein the spindle is configured to receive a cutting installation;
    a first gearbox containing gears that connect the spindle to the drive installation; and a rebound damper provided on the spindle to protect the gears, wherein an entity comprising the spindle and the rebound damper is configured so that a first ratio of a maximum diameter of the entity to a length of the entity is greater than 0.55, wherein the cutting installation is a milling head, wherein the rebound damper is a damping mass, and wherein the damping mass is provided so that a second ratio of inertia torque of the entity to a product of mass of the entity and length of the entity is greater than $4.0 \cdot 10^{-3}$ m.

2. The milling machine according to claim 1, wherein the first ratio is greater than 0.6.

3. The milling machine according to claim 2, wherein the first ratio is greater than 0.65.

4. The milling machine according to claim 1, wherein the second ratio is greater than $4.5 \cdot 10^{-3}$ m.

5. The milling machine according to claim 1, wherein the damping mass comprises an appendage that extends in a direction of a longitudinal axis of the spindle.

6. The milling machine according to claim 5, wherein the appendage is an annular web.

7. The milling machine according to claim 6, wherein a smallest diameter of the appendage is larger than an external diameter of a mounting of the spindle.

8. The milling machine according to claim 7, wherein at least part of the mounting is disposed within the annular web.

9. The milling machine according to claim 1, wherein the spindle comprises two spindle parts that are rotatable in relation to one another, the milling machine further comprising a spring clutch disposed between said two spindle parts for transmitting torque between said two spindle parts.

10. The milling machine according to claim 9, wherein the two spindle parts are a first part and a second part, the rebound damper being disposed on the first spindle part, and the second spindle part being configured to receive the cutting installation.

11. The milling machine according to claim 1, further comprising a further gearbox containing further gears, which further gearbox is disposed on an end of the spindle that is closest to the drive installation.

12. The milling machine according to claim 11, wherein the further gears comprise: (i) an internal ring gear that is releasably connected to the spindle, and (ii) a gear wheel that meshes with the internal ring gear and is releasably connected to the gears of the first gearbox.

13. The milling machine according to claim 1, wherein the milling head has a plurality of interchangeable cutting inserts, and is disposed on the spindle.

* * * * *